United States Patent
Liu (10) Patent No.: US 11,449,035 B2
(45) Date of Patent: Sep. 20, 2022

(54) INFORMATION PROCESSING DEVICE AND INFORMATION PROCESSING METHOD

(71) Applicant: FANUC CORPORATION, Minamitsuru-gun (JP)

(72) Inventor: Sichen Liu, Yamanashi-ken (JP)

(73) Assignee: FANUC CORPORATION, Minamitsuru-Gun (JP)

( * ) Notice: Subject to any disclaimer, the term of this patent is extended or adjusted under 35 U.S.C. 154(b) by 227 days.

(21) Appl. No.: 16/799,542

(22) Filed: Feb. 24, 2020

(65) Prior Publication Data

US 2020/0278659 A1 Sep. 3, 2020

(30) Foreign Application Priority Data

Feb. 28, 2019 (JP) .............................. JP2019-035585

(51) Int. Cl.
*G05B 19/4155* (2006.01)

(52) U.S. Cl.
CPC .............. *G05B 19/4155* (2013.01); *G05B 2219/49001* (2013.01)

(58) Field of Classification Search
CPC ...... G05B 19/4155; G05B 2219/49001; G05B 2219/37349; G05B 2219/37435; G05B 19/409; B23Q 17/22; B23Q 15/00; B23Q 15/22; B23Q 17/00
See application file for complete search history.

(56) References Cited

U.S. PATENT DOCUMENTS 6,065,338 A * 5/2000 Stoiber ................... F16F 15/36
73/462
6,338,003 B1 1/2002 Kamiguchi et al.
(Continued)

FOREIGN PATENT DOCUMENTS

JP S61-192451 A 8/1986
JP H08-106317 A 4/1996
(Continued)

OTHER PUBLICATIONS

Fan Hongwei, Jing Minqing and Liu Heng, "Program design of an online dynamic balancing system for grinding-wheel and spindle," 2011 IEEE International Conference on Computer Science and Automation Engineering, 2011, pp. 173-177 (Year: 2011).*
(Continued)

*Primary Examiner* — Christopher E. Everett
(74) *Attorney, Agent, or Firm* — McGinn I.P. Law Group, PLLC.

(57) ABSTRACT

An information processing device is connected to a measurement device provided in the vicinity of a machine tool for machining a workpiece using a tool and a numerical control device configured to control the machine tool. The information processing device includes: a display unit configured to display information; a first acquisition unit configured to acquire, from the measurement device, measurement information measured by the measurement device; a second acquisition unit configured to acquire, from the numerical control device, state information indicating a state of the machine tool; and a display control unit configured to cause the display unit to display the measurement information and the state information.

19 Claims, 4 Drawing Sheets

(56) References Cited

U.S. PATENT DOCUMENTS

| | | | |
|---|---|---|---|
| 6,354,151 B1 * | 3/2002 | Freyermuth | G01M 1/02 73/460 |
| 9,409,272 B2 | 8/2016 | Tezuka et al. | |
| 2010/0063615 A1 | 3/2010 | Mori et al. | |
| 2010/0119146 A1 | 5/2010 | Inazumi | |
| 2011/0128367 A1 | 6/2011 | Yoshioka et al. | |
| 2012/0163930 A1 | 6/2012 | Jeyaraman et al. | |
| 2012/0296463 A1 | 11/2012 | Rivers et al. | |
| 2012/0304764 A1 * | 12/2012 | Haimer | G01M 1/16 73/460 |
| 2013/0218322 A1 | 8/2013 | Carli | |
| 2014/0233839 A1 | 8/2014 | Morita et al. | |
| 2015/0229835 A1 | 8/2015 | Takahashi | |
| 2016/0001445 A1 | 1/2016 | Setsuda et al. | |
| 2016/0320772 A1 | 11/2016 | Ono et al. | |
| 2016/0334777 A1 | 11/2016 | Sato | |
| 2018/0107192 A1 | 4/2018 | Endo et al. | |

FOREIGN PATENT DOCUMENTS

| | | |
|---|---|---|
| JP | H09-244728 A | 9/1997 |
| JP | 2011-154436 A | 8/2011 |
| JP | 2012-093262 A | 5/2012 |
| JP | 2016-128182 A | 7/2016 |
| JP | 2018-028865 A | 2/2018 |
| WO | WO 2016/181450 A1 | 11/2016 |
| WO | WO-2017029381 A * | 2/2017 |

OTHER PUBLICATIONS

Japanese Office Action, dated May 11, 2021, in Japanese Patent Application No. 2019-635585 and English Translation thereof.

United States Office Action dated Feb. 1, 2022, in co-pending U.S. Appl. No. 16/799,514.

United States Office Action dated May 31, 2022, in co-pending U.S. Appl. No. 16/799,514.

* cited by examiner

INFORMATION PROCESSING DEVICE AND INFORMATION PROCESSING METHOD

CROSS-REFERENCE TO RELATED APPLICATION

This application is based upon and claims the benefit of priority from Japanese Patent Application No. 2019-035585 filed on Feb. 28, 2019, the contents of which are incorporated herein by reference.

BACKGROUND OF THE INVENTION

Field of the Invention

The present invention relates to an information processing device connected to a measurement device provided in the vicinity of a machine tool for machining a workpiece with a tool and a numerical control device for controlling the machine tool, and also relates to an information processing method.

Description of the Related Art

A numerical control device has a display unit for displaying state information indicating the state of a machine tool. For example, Japanese Laid-Open Patent Publication No. 08-106317 discloses a numerical control device that displays on a display screen the present position of a tool in a machine coordinate system, on the basis of rotational positions of servomotors etc.

On the other hand, commercially available measurement devices include cameras with display units, field balancers used for balance control of a rotary body like a spindle, probes used to measure inclination etc. of the workpiece, and so on. Such commercially available measurement devices are generally provided with a display unit for displaying the measured results.

SUMMARY OF THE INVENTION

However, when using commercially available measurement equipment, the operator checks the measurement information on the display unit of the measurement device and also checks the state information on the display unit of the numerical control device. That is, the operator has to check the measurement information and the state information on separate display screens. As such, in order to check the measurement information and state information more conveniently, the operator may be forced to, for example, change the position of installation of at least one of the measurement device and numerical control device. This will reduce work efficiency.

Accordingly, an object of the present invention is to provide an information processing device and information processing method that improves work efficiency.

A first aspect of the present invention is characterized by an information processing device that is connected to a measurement device and a numerical control device, the measurement device being provided in a vicinity of a machine tool configured to machine a workpiece using a tool, the numerical control device being configured to control the machine tool. The information processing device includes: a display unit configured to display information; a first acquisition unit configured to acquire, from the measurement device, measurement information measured by the measurement device; a second acquisition unit configured to acquire, from the numerical control device, state information indicating a state of the machine tool; and a display control unit configured to cause the display unit to display the measurement information and the state information.

A second aspect of the present invention is characterized by an information processing method for an information processing device that is connected to a measurement device and a numerical control device, the measurement device being provided in a vicinity of a machine tool configured to machine a workpiece using a tool, the numerical control device being configured to control the machine tool. The information processing method includes: an acquisition step of acquiring, from the measurement device, measurement information measured by the measurement device, and acquiring, from the numerical control device, state information indicating a state of the machine tool; and a display step of causing a display unit to display the measurement information and the state information.

According to the present invention, the operator can check both the measurement information and state information on a single display screen. Accordingly, the operator is not forced to change the position of installation of at least one of the measurement device and numerical control device for ease of checking both the measurement information and state information. This improves work efficiency.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

The present invention will now be described in detail while referring to the accompanying drawings in conjunction with preferred embodiments.

Embodiment

Figure 1:
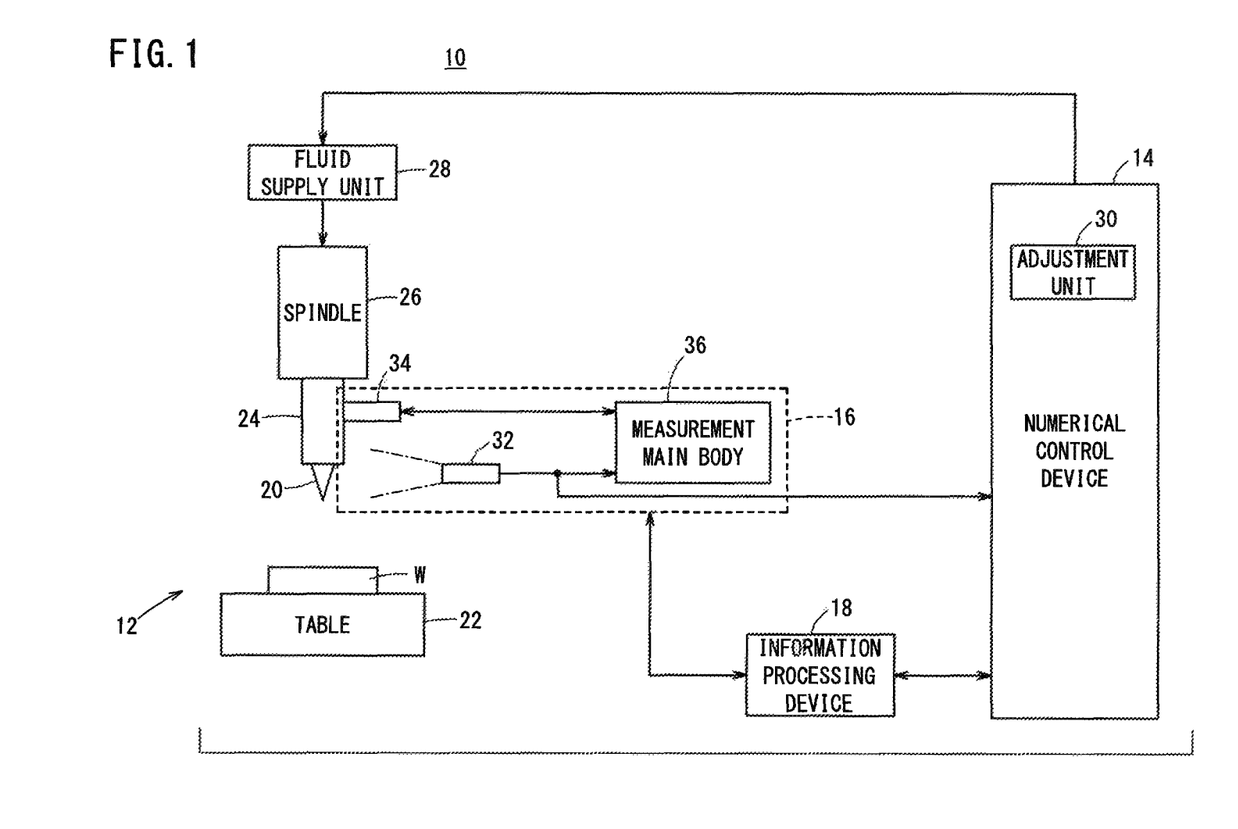
FIG. 1 is a schematic diagram illustrating a machining system according to an embodiment.

FIG. 1 is a schematic diagram illustrating a machining system 10 according to an embodiment. The machining system 10 of this embodiment includes a machine tool 12, a numerical control device 14, a measurement device 16, and an information processing device 18.

The machine tool 12 is configured to machine a workpiece W using a tool 20. The machine tool 12 includes the tool 20, a table 22, a tool holder 24, a spindle 26, and a fluid supply unit 28.

The tool 20 is a device for machining or cutting the workpiece W, such as a milling tool, for example. The table 22 supports the workpiece W in an exchangeable manner, and the tool holder 24 supports the tool 20 in an exchangeable manner. The spindle 26 is a shaft that is rotated by fluid like compressed air. The tool holder 24 is fixed at one end of the spindle 26. Hence, the tool 20 supported by the tool holder 24 rotates as the spindle 26 rotates. The fluid supply unit 28 supplies the spindle 26 with a fluid for rotating the spindle.

The numerical control device 14 is configured to control the machine tool 12. The numerical control device 14 includes an adjustment unit 30. The adjustment unit 30 applies a feedback control to the fluid supply unit 28 on the basis of the rotational speed of the spindle 26, in a manner so that the supply rate at which the fluid is supplied from the fluid supply unit 28 to the spindle 26 approaches a target value, to thereby adjust the supply rate at which the fluid supply unit 28 supplies the fluid to the spindle 26.

When the spindle 26 is configured to be rotated by rotation of a spindle motor, the spindle motor is generally provided with a rotation sensor for detecting the rotational speed of the spindle 26. In this embodiment, the spindle 26 is rotated by fluid, so that such a rotation sensor is not provided to detect the rotational speed of the spindle 26. Accordingly, the adjustment unit 30 obtains the rotational speed of the spindle 26 from the measurement device 16 and applies the feedback control to the fluid supply unit 28 on the basis of the obtained rotational speed.

The measurement device 16 is configured to measure an unbalance of the spindle 26 and installed in the vicinity of the machine tool 12. The measurement device 16 includes a rotation sensor 32, a vibration sensor 34, and a measurement main body 36.

The rotation sensor 32 is a sensor that measures the rotational speed of the spindle 26, and the vibration sensor 34 is a sensor that measures a vibration value of the spindle 26. The measurement main body 36 measures the unbalance of the spindle 26 on the basis of the rotational speed of the spindle 26 measured by the rotation sensor 32 and the vibration value of the spindle 26 measured by the vibration sensor 34. The unbalance is information that indicates at which rotation angle and to what extent balance abnormality is present.

Figure 2:
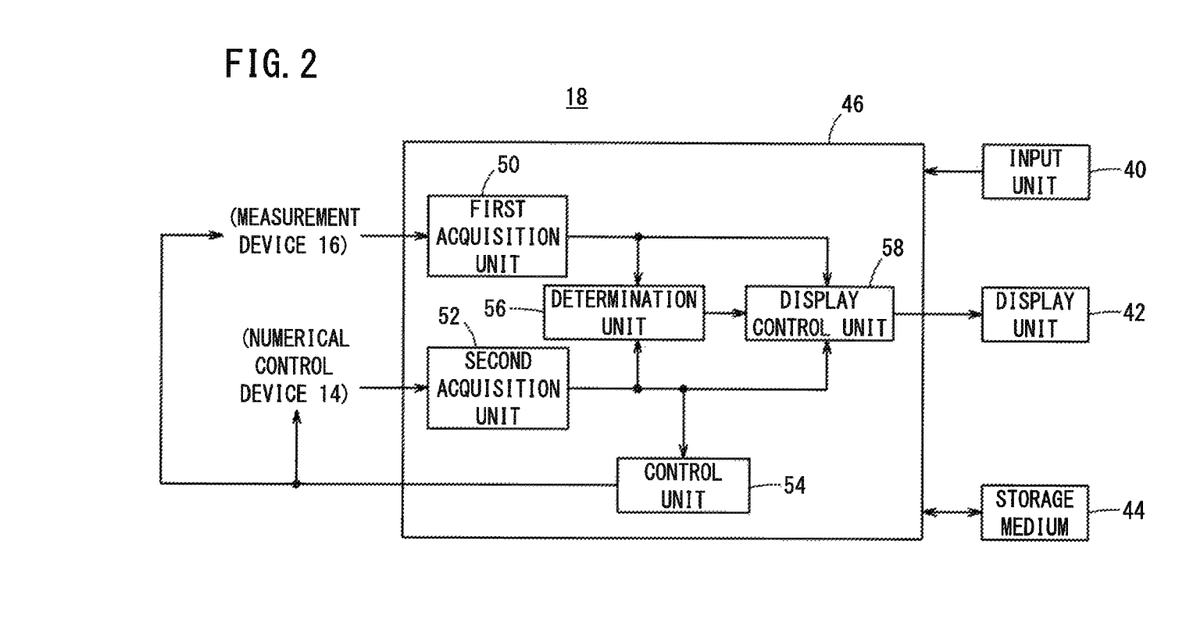
FIG. 2 is a schematic diagram illustrating the configuration of an information processing device.

The information processing device 18 is configured to process various information. The information processing device 18 is connected to the numerical control device 14 and the measurement device 16 so as to send and receive various information to and from the numerical control device 14 and the measurement device 16. FIG. 2 is a schematic diagram illustrating the configuration of the information processing device 18. The information processing device 18 includes an input unit 40, a display unit 42, a storage medium 44, and a signal processing unit 46.

The input unit 40 is an operation unit that allows the operator to enter commands etc. The input unit 40 includes a numeric keypad used for entering numerical data, a keyboard, a touch panel, a volume knob, and the like. The touch panel may be provided on a display screen of the display unit 42.

The display unit 42 is configured to display information, and the storage medium 44 is a medium that stores information. Specifically, the display unit 42 can be a liquid crystal display, and the storage medium 44 can be a hard disk, for example.

The signal processing unit 46 is connected to the input unit 40, the display unit 42, and the storage medium 44, and includes a processor such as CPU (Central Processing Unit) or MPU (Micro Processing Unit). The processor executes a basic program stored in the storage medium 44 so that the signal processing unit 46 functions as a first acquisition unit 50, a second acquisition unit 52, a control unit 54, a determination unit 56, and a display control unit 58.

The first acquisition unit 50 is configured to acquire, from the measurement device 16, measurement information measured by the measurement device 16. In this embodiment, the first acquisition unit 50 acquires the vibration value of the spindle 26 and the unbalance of the spindle 26 as the measurement information from the measurement device 16.

The second acquisition unit 52 is configured to acquire, from the numerical control device 14, state information indicating a state of the machine tool 12. In this embodiment, the second acquisition unit 52 acquires the rotational speed of the spindle 26 and the amount of deviation (positional deviation) of a control axis in an axial direction thereof, as the state information from the numerical control device 14, wherein the control axis is controlled by the numerical control device 14. The rotational speed of the spindle 26 that the second acquisition unit 52 acquires is the rotational speed that the numerical control device 14 has obtained from the measurement device 16.

The control unit 54 is configured to control the numerical control device 14 and the measurement device 16. The control unit 54 generates a spindle rotation command for rotating the spindle 26 at a rotational speed that is specified in accordance with an operation of the input unit 40 made by an operator, and outputs the generated spindle rotation command to the numerical control device 14, to thereby control the numerical control device 14 so that the spindle 26 rotates at the specified rotational speed.

On outputting the spindle rotation command to the numerical control device 14, the control unit 54 compares the rotational speed of the spindle 26 that the second acquisition unit 52 acquires from the numerical control device 14, with a given rotation threshold. If the rotational speed of the spindle 26 exceeds the rotation threshold, the control unit 54 outputs a measurement start command to the measurement device 16 so as to control the measurement device 16 to start measurement of the unbalance of the spindle 26.

The determination unit 56 is configured to determine whether the unbalance of the spindle 26 is abnormal or not. The determination unit 56 compares the vibration value that the first acquisition unit 50 acquires from the vibration sensor 34 of the measurement device 16, with a given vibration threshold, and compares the amount of axial deviation of the control axis that the second acquisition unit 52 acquires from the numerical control device 14, with a given axial deviation threshold.

Now, if the vibration value of the spindle 26 is equal to or greater than the vibration threshold, or if the amount of axial deviation of the control axis is equal to or greater than the given axial deviation threshold, then the determination unit 56 determines that the unbalance of the spindle 26 is abnormal. The determination unit 56 determines that the unbalance of the spindle 26 is abnormal also when the vibration value of the spindle 26 is equal to or greater than the vibration threshold and the amount of axial deviation of the control axis is equal to or greater than the given axial deviation threshold.

On the other hand, if the vibration value of the spindle 26 is less than the vibration threshold and the amount of axial deviation of the control axis is less than the given axial deviation threshold, then the determination unit 56 determines that the unbalance of the spindle 26 is not abnormal.

The display control unit 58 controls the display unit 42. When the determination unit 56 determines that the unbalance of the spindle 26 is not abnormal, then the display control unit 58 causes a message indicating that the unbalance of the spindle 26 is normal, to be displayed, for example.

On the other hand, when the determination unit 56 determines that the unbalance of the spindle 26 is abnormal, then the display control unit 58 causes the display unit 42 to display the measurement information acquired from the measurement device 16 by the first acquisition unit 50 and the state information acquired from the numerical control device 14 by the second acquisition unit 52.

Figure 3:
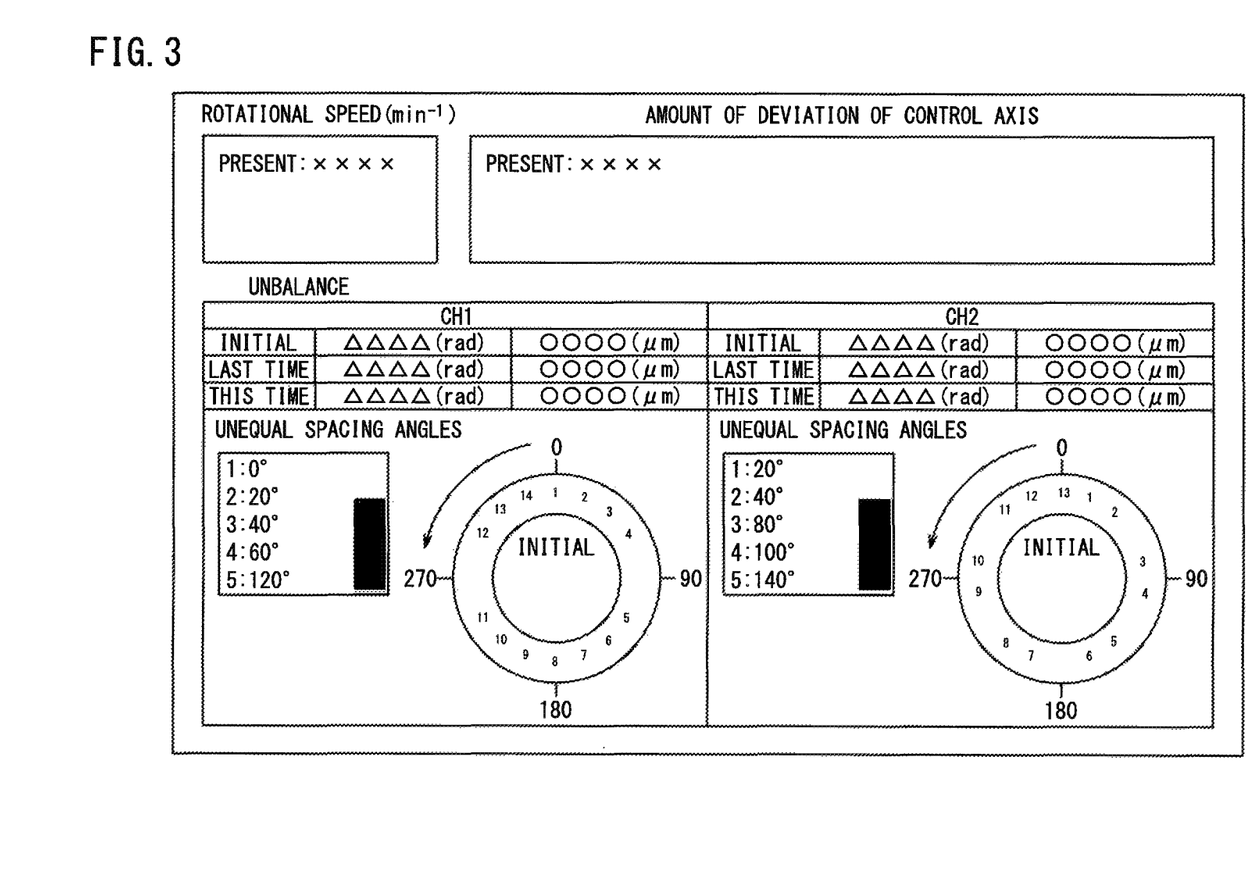
FIG. 3 is a diagram showing an example of how to display.

In this embodiment, as shown in FIG. 3, for example, the display control unit 58 causes the display unit 42 to display the rotational speed of the spindle 26 and the unbalance indicating at which rotation angle and to what extent the balance abnormal occurs. This allows the operator to correct the unbalance of the spindle 26 while checking the unbalance corresponding to the rotational speed of the spindle 26. As to the unbalance, though the example of FIG. 3 shows a screen displaying at which rotation angle and to what extent the balance abnormality is present, it may display a component force screen in the case where component forces of the rotating body (spindle 26) are not at equal intervals.

Figure 4:
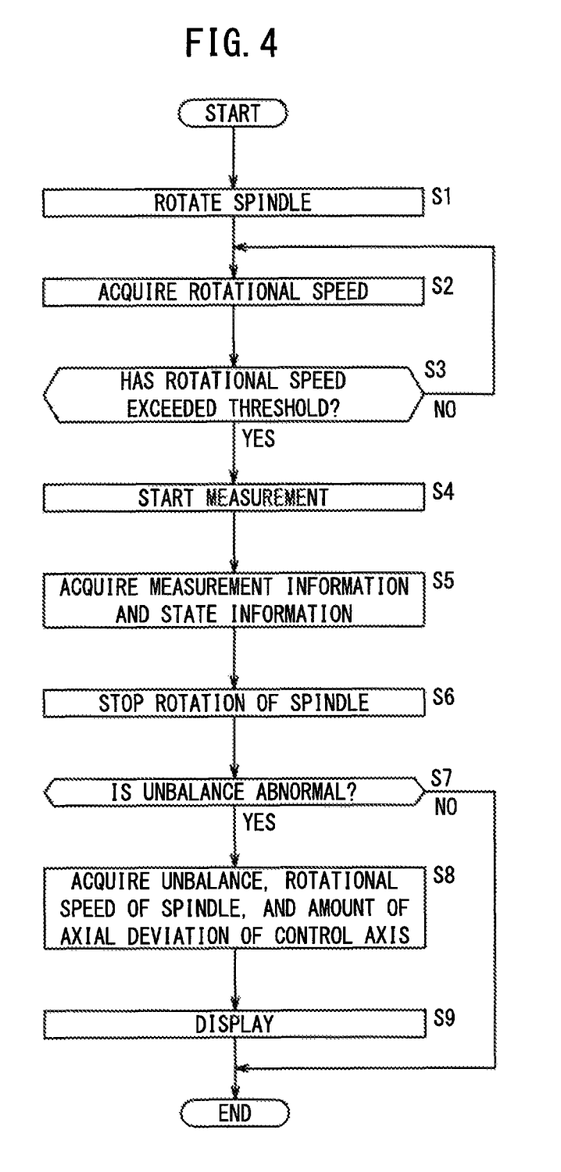
FIG. 4 is a flowchart showing the flow of an unbalance measurement mode.

Next, an information processing method of the information processing device 18 will be described. FIG. 4 is a flowchart showing the flow of an unbalance measurement mode.

In the information processing method of the information processing device 18, the process moves to step S1 when an unbalance mode for measuring the unbalance of the spindle 26 is set. At step S1, the control unit 54 outputs the spindle rotation command to the numerical control device 14 so as to control the numerical control device 14 to rotate the spindle 26 at the specified rotational speed, and then the process moves to step S2.

At step S2, the second acquisition unit 52 acquires the rotational speed of the spindle 26 from the numerical control device 14, and the process moves to step S3.

At step S3, the control unit 54 determines whether the rotational speed of the spindle 26 acquired at step S2 has exceeded the given rotation threshold. If the rotational speed of the spindle 26 has not exceeded the rotation threshold, the process returns to step S2. On the other hand, the process moves to step S4 if the rotational speed of the spindle 26 has exceeded the rotation threshold.

At step S4, the control unit 54 outputs the measurement start command to the measurement device 16 so as to cause the measurement device 16 to start the measurement of the unbalance of the spindle 26, and then the process moves to step S5.

At step S5, the first acquisition unit 50 acquires from the measurement device 16 the vibration value measured by the vibration sensor 34. Further, the second acquisition unit 52 acquires from the numerical control device 14 the amount of deviation of the control axis in the axial direction. When the vibration value of the spindle 26 and the amount of axial deviation of the control axis have both been acquired, the process moves to step S6.

At step S6, the control unit 54 outputs a rotation stop command for the spindle 26 to the numerical control device 14, so as to cause the numerical control device 14 to stop the rotation of the spindle 26, and then the process moves to step S7.

At step S7, the determination unit 56 determines whether the unbalance of the spindle 26 is abnormal or not on the basis of the vibration value of the spindle 26 and the amount of axial deviation of the control axis acquired at step S5. The determination unit 56 determines that the unbalance of the spindle 26 is normal if the vibration value of the spindle 26 is less than the vibration threshold and the amount of axial deviation of the control axis is less than the given axial deviation threshold. In this case, the display control unit 58 causes the display unit 42 to display a message indicating that the unbalance is normal, and then the unbalance measurement mode is put to an end.

On the other hand, if the vibration value of the spindle 26 is equal to or greater than the vibration threshold, or if the amount of axial deviation of the control axis is equal to or greater than the given axial deviation threshold, then the determination unit 56 determines that the unbalance of the spindle 26 is abnormal. The process then moves to step S8 in this case.

At step S8, the first acquisition unit 50 acquires the unbalance from the measurement device 16. Further, the second acquisition unit 52 acquires the rotational speed of the spindle 26 and the amount of axial deviation of the control axis from the numerical control device 14. When the unbalance and the rotational speed of the spindle 26 have both been acquired, the process moves to step S9.

At step S9, the display control unit 58 causes the unbalance and the rotational speed of the spindle 26 acquired at step S8 to be displayed on the same screen of the display unit 42, and then the unbalance measurement mode terminates.

MODIFICATIONS

The embodiment has been described above as an example of the present invention and the technical scope of the present invention is not limited to the scope of the embodiment above. The above-described embodiment can of course be modified or improved in various manners. It is clear from recitation of claims that such modified or improved embodiments are also included in the technical scope of the present invention.

First Modification

In the embodiment above, the spindle 26 is a shaft that is rotated by fluid. However, it may be a shaft that is rotated by a spindle motor. When the spindle 26 is a shaft rotated by a spindle motor, the fluid supply unit 28 is omitted. Further, the numerical control device 14 obtains the rotational speed of the spindle 26 from a rotation sensor provided to the spindle motor and applies a feedback control to the spindle motor based on the obtained rotational speed, to thereby adjust the rotational speed of the spindle 26 such that it approaches a target value.

Second Modification

In the embodiment above, the display control unit 58 causes the display unit 42 to display a massage indicating that the unbalance of the spindle 26 is normal when the unbalance is determined to be normal. In place of such a message, or in addition to such a message, the display control unit 58 may cause the display unit 42 to display the rotational speed of the spindle 26 and the unbalance. When the unbalance of the spindle 26 is determined to be normal, the display control unit 58 need not necessarily cause the display unit 42 to display a message indicating that the unbalance is normal.

Third Modification

The above-described embodiment and modifications may be arbitrarily combined in a range in which no inconsistencies occur therein.

Invention Obtained from Embodiments and Modifications

The invention graspable from the above-described embodiments and modifications will be recited below.
(First Invention)

A first invention provides the information processing device (18) connected to a measurement device (16) and a numerical control device (14), the measurement device being provided in the vicinity of a machine tool (12) configured to machine a workpiece (W) using a tool (20), the numerical control device (14) being configured to control the machine tool (12). The information processing device (18) includes: a display unit (42) configured to display information; a first acquisition unit (50) configured to acquire, from the measurement device (16), measurement information measured by the measurement device (16); a second acquisition unit (52) configured to acquire, from the numerical control device (14), state information indicating a state of the machine tool (12); and a display control unit (58) configured to cause the display unit (42) to display the measurement information and the state information.

The above configuration makes it possible for an operator to check both the measurement information and state information on a single display screen. Thus, the operator is not forced to change the position of installation of at least one of the measurement device (16) and the numerical control device (14) for ease of checking both the measurement information and state information. This improves work efficiency.

The measurement device (16) may be configured to measure an unbalance of a spindle (26) of the machine tool (12), and the display control unit (58) may be configured to provide control to display the measurement information indicating the unbalance of the spindle (26) and the state information indicating a rotational speed of the spindle (26) and the amount of deviation of a control axis in an axial direction thereof, the control axis being controlled by the numerical control device (14). This allows the operator to correct the unbalance of the spindle (26) while checking the unbalance corresponding to the rotational speed of the spindle (26) and the amount of axial deviation of the control axis.

The information processing device (18) may further include a determination unit (56) configured to determine whether the unbalance of the spindle (26) is abnormal or not, and the display control unit (58) may cause the measurement information and the state information to be displayed when the unbalance of the spindle (26) is determined to be abnormal. This prevents the operator from erroneously adjusting the unbalance of the spindle (26) when the unbalance of the spindle (26) is normal.

The determination unit (56) may be configured to determine that the unbalance of the spindle (26) is abnormal if a vibration value of the spindle (26) is equal to or greater than a given vibration threshold or if the amount of deviation of the control axis in the axial direction is equal to or greater than a given axial deviation threshold. This improves accuracy of the determination as compared to cases where the unbalance of the spindle (26) is determined to be abnormal only on the basis of the vibration value.

The information processing device (18) may further include a control unit (54) configured to control the numerical control device (14) to rotate the spindle (26), and also configured to control the measurement device (16) to start the measurement of the unbalance of the spindle (26) when the rotational speed of the spindle (26) has exceeded a given rotation threshold. This prevents the determination unit (56) from making an incorrect determination on the basis of the unbalance that is measured when the rotational speed of the spindle (26) is unstable.

The spindle (26) may be configured to be rotated by a fluid supplied from a fluid supply unit (28), the numerical control device (14) may include an adjustment unit (30) configured to adjust a supply rate at which the fluid supply unit (28) supplies the fluid to the spindle (26), based on the rotational speed of the spindle (26) obtained from the measurement device (16), and the second acquisition unit (52) may acquire from the numerical control device (14) the rotational speed of the spindle (26) obtained from the measurement device (16) by the numerical control device (14). Thus, it is possible to display the rotational speed of the spindle (26) even when the machine tool (12) is not provided with a rotation sensor.
(Second Invention)

A second invention provides an information processing method for an information processing device (18) that is connected to a measurement device (16) and a numerical control device (14), the measurement device being provided in the vicinity of a machine tool (12) configured to machine a workpiece (W) using a tool (20), the numerical control device (14) being configured to control the machine tool (12). The information processing method includes: an acquisition step (S5) of acquiring, from the measurement device (16), measurement information measured by the measurement device (16), and acquiring, from the numerical control device (14), state information indicating a state of the machine tool (12); and a display step (S9) of causing a display unit (42) to display the measurement information and the state information.

Owing thereto, an operator can check both the measurement information and state information on a single display screen. Thus, the operator is not forced to change the position of installation of at least one of the measurement device (16) and the numerical control device (14) for ease of checking both the measurement information and state information. This improves work efficiency.

The measurement device (16) may be configured to measure an unbalance of a spindle (26) of the machine tool (12), and the display step (S9) may display the measurement information indicating the unbalance of the spindle (26) and the state information indicating a rotational speed of the spindle (26) and the amount of deviation of a control axis in an axial direction thereof, the control axis being controlled by the numerical control device (14). This allows the operator to correct the unbalance of the spindle (26) while checking the unbalance corresponding to the rotational speed of the spindle (26) and the amount of axial deviation of the control axis.

The information processing method may further include a determination step (S7) of determining whether the unbalance of the spindle (26) is abnormal or not, and the display step (S9) may display the measurement information and the state information when the unbalance of the spindle (26) is determined to be abnormal. This prevents the operator from erroneously adjusting the unbalance of the spindle (26) when the unbalance of the spindle (26) is normal.

The determination step (S7) may determine that the unbalance of the spindle (26) is abnormal if a vibration value of the spindle (26) is equal to or greater than a given vibration threshold or if the amount of deviation of the control axis in the axial direction is equal to or greater than a given axial deviation threshold. This improves accuracy of the determination as compared to cases where the unbalance of the spindle (26) is determined to be abnormal only on the basis of the vibration value.

The information processing method may further include a rotation control step (S1) of controlling the numerical control device (14) to rotate the spindle (26); and a measurement control step (S4) of controlling the measurement device (16) to start the measurement of the unbalance of the spindle (26) when the rotational speed of the spindle (26) has exceeded a given rotation threshold. This prevents the determination unit (56) from making an incorrect determination on the basis of the unbalance that is measured when the rotational speed of the spindle (26) is unstable.

The present invention is not particularly limited to the embodiments described above, and various modifications are possible without departing from the essence and gist of the present invention.

What is claimed is:

1. An information processing device that is connected to a measurement device and a numerical control device, the measurement device being provided in a vicinity of a machine tool configured to machine a workpiece using a tool, the numerical control device being configured to control the machine tool, the information processing device comprising:
    a display unit configured to display information;
    a first acquisition unit configured to acquire, from the measurement device, measurement information measured by the measurement device;
    a second acquisition unit configured to acquire, from the numerical control device, state information indicating a state of the machine tool; and
    a display control unit configured to cause the display unit to display the measurement information and the state information,
    wherein the state information includes an amount of a deviation of a control axis in an axial direction of the machine tool as determined based on a rotational speed of the machine tool, and
    wherein the measurement device is configured to measure an unbalance of the machine tool.

2. The information processing device according to claim 1, wherein the display control unit simultaneously displays the measurement information and the state information on the display unit.

3. The information processing device according to claim 1, wherein the state information includes the amount of the deviation of the control axis in the axial direction of a spindle of the machine tool, and
    wherein the control axis is controlled by the numerical control device.

4. The information processing device according to claim 1, wherein the state information includes the amount of the deviation of the control axis in the axial direction of a spindle of the machine tool,
    further comprising a control unit configured to control the numerical control device to rotate the spindle, and also configured to control the measurement device to start the measurement of the unbalance of the spindle when the rotational speed of the spindle has exceeded a given rotation threshold.

5. The information processing device according to claim 1, wherein the display unit comprises a single display screen configured to simultaneously display the measurement information and the state information.

6. The information processing device according to claim 1, further comprising a determination unit configured to cause the display unit to display a warning based on the measurement information and the state information.

7. The information processing device according to claim 6, wherein the warning is displayed simultaneously with the measurement information and the state information on the display unit.

8. The information processing device according to claim 1, wherein the state information includes the amount of the deviation of the control axis in the axial direction of a spindle of the machine tool,
    further comprising a determination unit configured to cause the display unit to display a warning when the deviation is greater than a threshold value.

9. An information processing device that is connected to a measurement device and a numerical control device, the measurement device being provided in a vicinity of a machine tool configured to machine a workpiece using a tool, the numerical control device being configured to control the machine tool, the information processing device comprising:
    a display unit configured to display information;
    a first acquisition unit configured to acquire, from the measurement device, measurement information measured by the measurement device;
    a second acquisition unit configured to acquire, from the numerical control device, state information indicating a state of the machine tool; and
    a display control unit configured to cause the display unit to display the measurement information and the state information, wherein:
        the measurement device is configured to measure an unbalance of a spindle of the machine tool; and
        the display control unit is configured to provide control to display the measurement information indicating the unbalance of the spindle and the state information indicating a rotational speed of the spindle and an amount of a deviation of a control axis in an axial direction thereof, the control axis being controlled by the numerical control device.

10. The information processing device according to claim 9, further comprising a determination unit configured to determine whether the unbalance of the spindle is abnormal or not,
    wherein the display control unit causes the measurement information and the state information to be displayed when the unbalance of the spindle is determined to be abnormal.

11. The information processing device according to claim 10, wherein the determination unit is configured to determine that the unbalance of the spindle is abnormal if a vibration value of the spindle is equal to or greater than a given vibration threshold or if the amount of deviation of the control axis in the axial direction is equal to or greater than a given axial deviation threshold.

12. The information processing device according to claim 9, further comprising a control unit configured to control the numerical control device to rotate the spindle, and also configured to control the measurement device to start the measurement of the unbalance of the spindle when the rotational speed of the spindle has exceeded a given rotation threshold.

13. The information processing device according to claim 9, wherein:
    the spindle is configured to be rotated by a fluid supplied from a fluid supply unit;
    the numerical control device includes an adjustment unit configured to adjust a supply rate at which the fluid supply unit supplies the fluid to the spindle, based on the rotational speed of the spindle obtained from the measurement device; and the second acquisition unit acquires from the numerical control device the rotational speed of the spindle obtained from the measurement device by the numerical control device.

14. An information processing method for an information processing device that is connected to a measurement device and a numerical control device, the measurement device being provided in a vicinity of a machine tool configured to machine a workpiece using a tool, the numerical control device being configured to control the machine tool, the information processing method comprising:

an acquisition step of acquiring, from the measurement device, measurement information measured by the measurement device, and acquiring, from the numerical control device, state information indicating a state of the machine tool; and a display step of causing a display unit to display the measurement information and the state information, wherein the state information includes an amount of a deviation of a control axis in an axial direction of the machine tool as determined based on a rotational speed of the machine tool, and wherein the measurement device is configured to measure an unbalance of the machine tool.

15. The information processing method according to claim 14, wherein:

the measurement device is configured to measure the unbalance of a spindle of the machine tool; and the display step displays the measurement information indicating the unbalance of the spindle and the state information indicating the rotational speed of the spindle and the amount of the deviation of the control axis in an axial direction thereof, the control axis being controlled by the numerical control device.

16. The information processing method according to claim 15, further comprising a determination step of determining whether the unbalance of the spindle is abnormal or not, wherein the display step displays the measurement information and the state information when the unbalance of the spindle is determined to be abnormal.

17. The information processing method according to claim 16, wherein the determination step determines that the unbalance of the spindle is abnormal if a vibration value of the spindle is equal to or greater than a given vibration threshold or if the amount of deviation of the control axis in the axial direction is equal to or greater than a given axial deviation threshold.

18. The information processing method according to claim 15, further comprising a rotation control step of controlling the numerical control device to rotate the spindle; and a measurement control step of controlling the measurement device to start the measurement of the unbalance of the spindle when the rotational speed of the spindle has exceeded a given rotation threshold.

19. The information processing method according to claim 15, wherein:

the spindle is configured to be rotated by a fluid supplied from a fluid supply unit;

the numerical control device includes an adjustment unit configured to adjust a supply rate at which the fluid supply unit supplies the fluid to the spindle, based on the rotational speed of the spindle obtained from the measurement device; and the acquisition step acquires from the numerical control device the rotational speed of the spindle obtained from the measurement device by the numerical control device.

* * * * *